(12) United States Patent
Wang

(10) Patent No.: US 8,543,474 B2
(45) Date of Patent: Sep. 24, 2013

(54) METHOD, COMMUNICATION APPARATUS AND SYSTEM FOR HANDLING A RECHARGE SERVICE

(75) Inventor: Bin Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 922 days.

(21) Appl. No.: 12/576,885

(22) Filed: Oct. 9, 2009

(65) Prior Publication Data

US 2010/0094734 A1 Apr. 15, 2010

(30) Foreign Application Priority Data

Oct. 9, 2008 (CN) .......................... 2008 1 0223743

(51) Int. Cl.
*G06F 17/00* (2006.01)
*G06F 19/00* (2011.01)
*G06Q 40/00* (2012.01)
*G06Q 30/02* (2012.01)
*G07F 7/10* (2006.01)
*G07F 19/00* (2006.01)

(52) U.S. Cl.
CPC .............. *G06Q 30/02* (2013.01); *G07F 7/1008* (2013.01); *G07F 19/20* (2013.01)
USPC .............. 705/30; 235/375; 235/379; 235/380; 235/382; 455/405; 455/406; 455/410; 455/411; 455/414.1

(58) Field of Classification Search
CPC ........ G06Q 30/02; G07F 7/1008; G07F 19/20
USPC ..... 455/405, 406, 410, 414.1, 411; 711/114, 711/165, 170; 235/375, 379, 380, 382
See application file for complete search history.

(56) References Cited

U.S. PATENT DOCUMENTS

| 6,415,372 B1 * | 7/2002 | Zakai et al. .................... 711/165 |
| 6,467,684 B2 * | 10/2002 | Fite et al. ....................... 235/379 |
| 6,912,383 B1 * | 6/2005 | Li et al. .......................... 455/406 |

(Continued)

FOREIGN PATENT DOCUMENTS

CN 101237617 A * 8/2008

OTHER PUBLICATIONS

Extended European Search Report in corresponding European Patent Application No. 09012779.6 (Apr. 24, 2010).

(Continued)

*Primary Examiner* — Matthew Gart
*Assistant Examiner* — Olusegun Goyea
(74) *Attorney, Agent, or Firm* — Leydig, Voit & Mayer, Ltd.

(57) ABSTRACT

Methods and systems for handling a recharge service and communication apparatuses thereof are disclosed. The method includes receiving a recharge service request; checking whether an abnormal recharge log includes a recharge card ID and whether a recharging process has been successfully performed via a recharge card associated with the recharge card ID; requesting a voucher center to authenticate the recharge card associated with the recharge card ID so that the voucher center may recharge, after the recharge card passes the authentication, the user account via the recharge card if the recharge card ID carried in the recharge service request is not contained in the abnormal recharge log, or a recharging process has not been successfully performed via the recharge card associated with the recharge card ID carried in the recharge service request.

11 Claims, 5 Drawing Sheets

(56) References Cited

U.S. PATENT DOCUMENTS

| | | | |
|---|---|---|---|
| 7,428,658 B2* | 9/2008 | Nagin et al. | 714/47.1 |
| 7,543,737 B2* | 6/2009 | Bensimon et al. | 235/380 |
| 8,160,544 B2* | 4/2012 | Myers et al. | 455/406 |
| 2004/0088249 A1* | 5/2004 | Bartter et al. | 705/39 |
| 2004/0088250 A1* | 5/2004 | Bartter et al. | 705/39 |
| 2004/0102182 A1* | 5/2004 | Reith et al. | 455/410 |
| 2005/0269399 A1* | 12/2005 | Bensimon et al. | 235/380 |
| 2006/0107102 A1* | 5/2006 | Nagin et al. | 714/7 |
| 2009/0023427 A1* | 1/2009 | Kahn et al. | 455/414.1 |
| 2009/0194582 A1* | 8/2009 | Ye | 235/375 |

OTHER PUBLICATIONS $2^{nd}$ Office Action in corresponding Chinese Patent Application No. 200810223743.X (Nov. 5, 2012).

* cited by examiner

METHOD, COMMUNICATION APPARATUS AND SYSTEM FOR HANDLING A RECHARGE SERVICE

CROSS-REFERENCE TO RELATED APPLICATIONS

This application claims the priority of Chinese Patent Application No. 200810223743.X, filed on Oct. 9, 2008, titled "METHOD, COMMUNICATION APPARATUS AND SYSTEM FOR HANDLING A RECHARGE SERVICE," the entire content of which is incorporated herein by reference.

FIELD OF THE INVENTION

The present disclosure relates to communication field, and more specifically, to methods, communication apparatuses and systems for handling a recharge service.

BACKGROUND

To facilitate the settlement with a user using a communication service, the service provider offers an account for each user exploiting the communication service. The user may deposit money into his or her account by dialing an access number provided by the operator or with the help of a work staff at a service center. When the user is exploiting a communication service, or after the user uses the communication service, the service provider may charge the fee for the service used by the user and charge the user account accordingly. The system for recharge service provided by the operator is called a voucher system. The voucher system includes one or more Voucher Centers (hereinafter VC). The VC stores information of a recharge card, for example, the number or status of the recharge card, etc. The status of the recharge card may be categorized into two types: valid status and invalid status. The valid status indicates that the recharge card has not been used for recharging and the card is within a valid period. The invalid status indicates that the recharge card has been used or the card is expired. Each recharge card has a key for identification. When the user is refilling the card, the key of the recharge card is required. The VC deposits the credit associated with the recharge card into the user account.

In a traditional intelligent network, the user account is stored in a Service Control Point (SCP) or a data service charging gateway. Generally, the data service charging gateway may do the rating and connect to the SCP to deduct the fee from the account. With the development of the telecommunication network, traditional intelligent network and data service charging gateway are evolving into an integrated charging system. In the evolved integrated charging system in the telecommunication network, the charging function is separated from a service control layer and a charging layer and is handled by a newly added network element, i.e., Online Charging System (OCS). Generally, the OCS has rating, charging, user account balance management and account management functions. The service control function which connects to and interacts with a service bearer layer may still remain in a network element in the service control layer. Currently, the user may recharge the account via an automatic recharge procedure by calling an access number or via a manual recharge procedure operated by a work staff at the service center. A conventional recharge procedure based on 3GPP network architecture mainly includes the followings. The SCP interacts with the VC to query for recharge card information. After the SCP passes the verification by the VC, the SCP interacts with the OCS and instructs the OCS to recharge via the recharge card associated with a recharge handling request. After the SCP receives a message indicating that the OCS has recharges the card successfully, the SCP interacts with the VC to instruct VC to set the recharge card and finally the SCP sends a recharge confirmation message to the OCS.

It is discovered that the above conventional recharge procedure encounters at least the following problems.

In the case where signaling loss or signaling timeout takes places in a signaling layer during the above recharge procedure (e.g., the SCP fails to receive an acknowledgement message indicating a successful recharge returned from the OCS within a predetermined time period or the SCP fails to send a recharge card setting request or the VC fails to set the recharge card and the SCP fails to receive the setting response message returned by the VC), the OCS has already completed the recharge for the user but the VC fails to set the recharge card in the above cases. The status of the recharge card in the VC still remains in a valid status which allows the recharge card to be used again. Consequently, this would bring huge loss to the operator.

SUMMARY

Methods, communication apparatuses and systems for handling a recharge service according to embodiments of the present disclosure are provided so as to prevent a same recharge card from being used for recharging repeatedly.

A method for handling a recharge service is provided according to one embodiment of the present disclosure. The method includes:

receiving a recharge service request, wherein the recharge service request includes a recharge card ID and a user account to be recharged;

checking whether an abnormal recharge log includes the recharge card ID and whether a recharging process has been successfully performed via a recharge card associated with the recharge card ID;

requesting a voucher center to authenticate the recharge card associated with the recharge card ID so that the voucher center may recharge, after the recharge card passes the authentication, the user account via the recharge card if the recharge card ID carried in the recharge service request is not contained in the abnormal recharge log, or if a recharging process has been successfully performed via the recharge card associated with the recharge card ID carried in the recharge service request.

A communication apparatus is provided according to one embodiment of the present disclosure. The apparatus includes an information interaction module and a first query module.

The information interaction module is configured to receive a recharge service request which includes a recharge card ID and a user account to be recharged; and according to the query result obtained by the first query module, if the recharge card ID carried in the recharge service request is not contained in an abnormal recharge log, or the recharging process has not been successfully performed via the recharge card associated with the recharge card ID, the information interaction module is further configured to request a voucher center to authenticate the recharge card so that the voucher center may recharge, after the recharge card passes the authentication, the user account via the recharge card.

The first query module is configured to check whether the abnormal recharge log includes the recharge card ID and whether the recharging process has been successfully performed via the recharge card associated with the recharge card ID.

A communication apparatus is provided according to one embodiment of the present disclosure. The apparatus includes:
- a first receiving module, configured to receive a recharge request for recharging a user account sent by a service control point, wherein the recharge request includes a recharge card ID and a user account to be recharged; and further configured to receive a recharge confirmation request sent by the service control point;
- a recharge module, configured to recharge the user account via the recharge card and generate an acknowledgement indicating a successful recharge when the first receiving module receives the recharge request, and configured to complete the recharge and generate a recharge confirmation result when the first receiving module receives the recharge confirmation request, wherein the recharge confirmation result comprises recharge time and recharge amount;
- a first sending module, configured to send the acknowledgement indicating a successful recharge to the service control point after the recharge module recharges the user account and configured to send the recharge confirmation result to the service control point;
- a write-in module, configured to record a recharge card ID in an abnormal recharge log when the write-in module receives a write-in notification sent by the service control point or when the recharge module fails to generate the acknowledgement indicating a successful recharge or when the first sending module fails to send the acknowledgement indicating a successful recharge.

A communication apparatus is provided according to one embodiment of the present disclosure. The apparatus includes:
- a second receiving module, configured to receive an authentication request and a recharge card setting request sent by a service control point to a voucher center, wherein the authentication request and the recharge card setting request carry a recharge card ID;
- a setting module, configured to set a recharge card associated with the recharge card ID according to the recharge card setting request or when an abnormal recharge log and a setting failure log contain a same recharge card ID and the recharging process has been successfully performed via the recharge card associated with the recharge card ID;
- an authentication module, configured to determine the validity of the recharge card associated with the recharge card ID carried in the authentication request after receiving the authentication request;
- a second query module, configured to check, based on the determination result from the authentication module, whether the setting failure log contains the recharge card ID carried in the authentication request and whether the user account carried in the authentication request is the same as the user account in the setting failure log associated with the recharge card ID carried in the authentication request, wherein the setting failure log is used to record failures in setting the recharge card and the setting failure log contains relationship between the recharge card ID of the recharge card where setting fails and the user account;
- a second sending module, configured to send, based on the result obtained from the authentication module and the second query module, an authentication result message indicating that the recharge card has passed the authentication to the service control point when the setting failure log does not contain the recharge card ID carried in the authentication request, or the recharge card is in a valid status, or the recharge card is in a valid status and the user account carried in the authentication request is the same as the user account in the setting failure log associated with the recharge card ID carried in the authentication request; and configured to send an authentication result message indicating that the recharge card has not passed the authentication to the service control point when the recharge card associated with the recharge card ID carried in the authentication request is in an invalid or unavailable status or when the recharge card is valid but the user account carried n the authentication request is different from the user account in the setting failure log associated with the recharge card ID carried in the authentication request; and configured to send a recharge card setting response to the service control point after the setting module sets the recharge card successfully.

A system for handling a recharge service is provided according to one embodiment of the present disclosure. The system includes a service control point, an online charging system and a voucher center. The service control point is configured to send a recharge card setting request to the voucher center and start to count time wherein the recharge card setting request includes a recharge card ID. The service control point is further configured to send a rollback request to the online charging system when the service control point fails to send the recharge card setting request or the service control point fails to receive a recharge card setting response returned by the voucher center in response to the recharge card setting request within a predetermined time period after the recharge card setting request is sent, wherein the rollback request is used to request the online charging system to stop depositing credit into the user account, and the rollback request includes the recharge card ID and a user account to be recharged.

Methods, systems for handling a recharge service and apparatuses thereof according to embodiments of the present disclosure records in an abnormal recharge log a recharge card ID for the recharge card which has been successfully used for recharging and recharge result information indicating whether a recharging process has been successfully performed in an online charging system via the recharge card associated with the recharge card ID. When a service control point receives a recharge service request, the service control point checks whether the abnormal recharge log contains the recharge card carried in the recharge service request and determines if a recharging process has been successfully performed in an online charging system via the recharge card. When a recharging procedure has been successfully performed in an online charging system via the recharge card, subsequent recharge procedure will not be performed. The recharge card is authenticated and the subsequent recharge procedure proceeds only when the abnormal recharge log does not contain the recharge card carried in the recharge service request or when a recharging process has not been successfully performed via the recharge card associated with the recharge card ID. Consequently, one recharge card is prevented from being used for recharging repeatedly, and thus economic loss to the operator can be avoided.

DETAILED DESCRIPTION

Detailed description is made to the technical solutions of the present disclosure in connection with the drawings and various embodiments.

Figure 1:
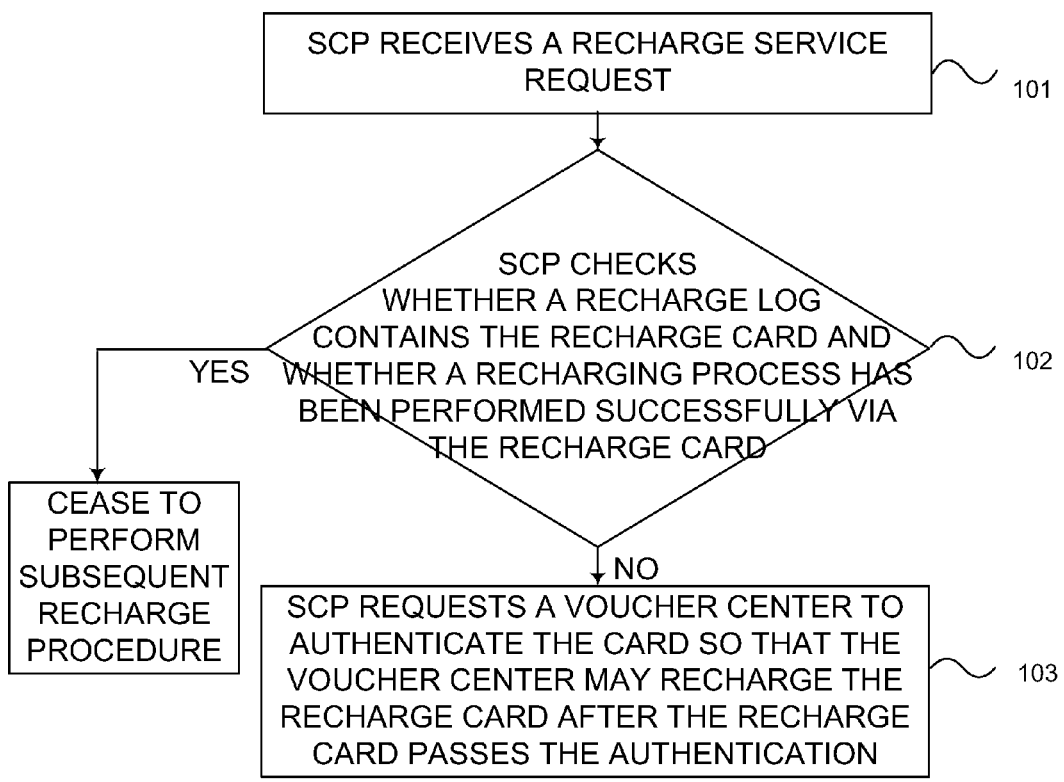
FIG. 1 is a flowchart of a method for handling a recharge service according to a first method embodiment of the present disclosure.

The methods, communication apparatuses and the systems for handling a recharge service according to embodiments of the present disclosure can be implemented with 3GPP network architecture. The 3GPP network architecture may include a service bearer layer, a service control layer, and a charging layer. The charging layer function is implemented by a net element, OCS. The charging layer function mainly includes rating, charging, account balance management, account management functions. The service control function which is connected to and interacts with the service bearer layer is implemented by a net element, SCP, in the service control layer. FIG. 1 is a flowchart of a method for handling a recharge service according to a first method embodiment of the present disclosure. The method includes the following steps.

Step 101: The SCP receives a recharge service request. The recharge service request includes a recharge card ID and a user account to be recharged. The recharge card ID is used to uniquely identify the recharge card. In particular, the recharge card ID may be a recharge card number or a recharge card key, or may be a combination of the recharge card number and the recharge card key.

Step 102: The SCP queries an abnormal recharge log to see if it contains a recharge card ID carried in the recharge service request and a recharging process has been successfully performed in the OCS via the recharge card associated with the recharge card ID. The abnormal recharge log includes a recharge card ID and the recharge result information indicating whether a recharging process has been successfully performed in the OCS via the recharge card associated with the recharge card ID.

The abnormal recharge log according to the embodiments of the present disclosure is logged when the recharge procedure is abnormal. That is, the abnormal recharge log is logged when the signaling loss or signaling timeout at a certain signaling layer occurs and it can not be determined whether the OCS has performed a successful recharge or whether the VC sets the recharge card successfully.

Step 103: If the recharge card ID carried in the recharge service request is not contained in the abnormal recharge log, or if a recharging process has not been successfully performed via the recharge card associated with the recharge card ID carried in the recharge service request, the SCP may request the VC to authenticate the recharge card so that the VC may recharge, after the recharge card passes the authentication, the user account to be recharged via the recharge card.

In step 102, if the SCP discovers that the abnormal recharge log contains the recharge card ID carried in the recharge service request and the recharge result information shows that a recharging procedure has already been successfully performed via the recharge card identified by the recharge card ID, subsequent recharge procedure will not be performed any more. Specifically, the SCP may send a message indicating that the recharge card is not available or a message indicating that the authentication fails to a user terminal sending the recharge service request.

In the method embodiment for handling the recharge service as illustrated in FIG. 1, when the SCP receives the recharge service request, the SCP may check, based on the recharge card ID and the associated recharge result information recorded in the abnormal recharge log, whether the abnormal recharge log contains the recharge card ID carried in the recharge service request and whether a recharging process has been successfully performed via the recharge card associated with the recharge card ID. The recharge card is authenticated and the subsequent recharge procedure is performed only when a recharging process has not been successfully performed via the recharge card associated with the recharge card ID, or when the abnormal recharge log does not contain the recharge card ID. If the recharging process has already been successfully performed via the recharge card associated with the recharge card ID, the subsequent recharge procedure will not be performed any more. Thus, the recharge card is prevented from being used for recharging again in the situation that a recharging process has been successfully performed via the recharge card associated with the recharge card ID but the recharge card has not been successfully set. Consequently, a recharge card is prevented from being used for recharging again and again, thus avoiding the economic loss to the operator.

Figure 2:
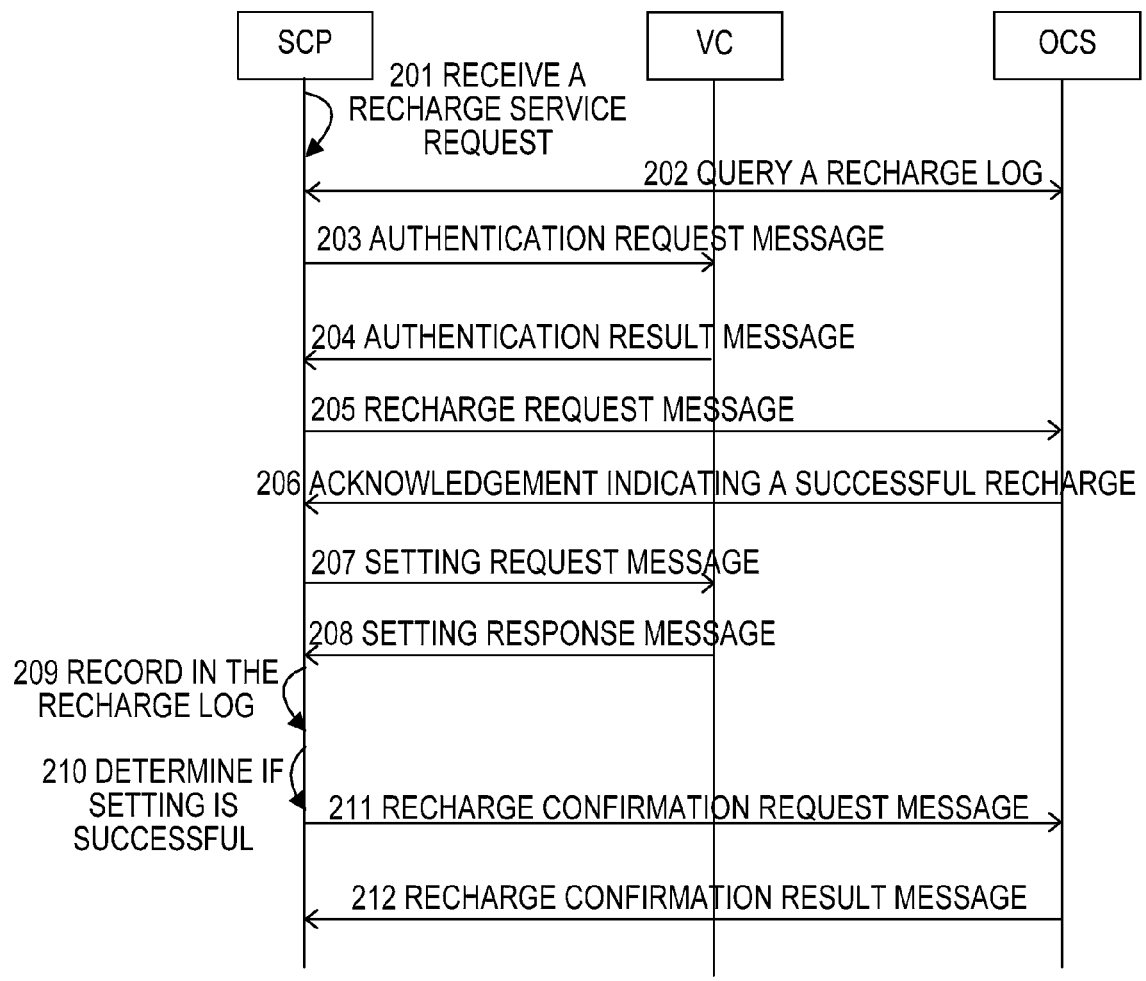
FIG. 2 is a flowchart of a method for handling a recharge service according to a second method embodiment of the present disclosure.

FIG. 2 is a flowchart of a method for handling recharge service according to a second method embodiment of the present disclosure. The procedure of handling a recharge service according to the present embodiment includes the following steps.

Step 201: The SCP receives a recharge service request. The recharge service request includes a recharge card ID and a user account to be recharged. The recharge card ID is used to uniquely identify the recharge card. In particular, the recharge card ID may be a recharge card number or a recharge card key, or may be a combination of the recharge card number and the recharge card key.

Specifically, the SCP may receive the recharge service request in two approaches. As one of the two approaches, the recharge service request may be a call request initiated by a user terminal by dialing a recharge access number or may be a call request initiated via other access number. The call request is then connected to the Visitor Mobile Switching Center which may trigger the request to a home SCP according to the access number. Then, the SCP interacts with the user terminal and collects the user account to be recharged and the recharge card ID. As the other approach, the recharge service request may also be initiated by the administrator from a Business and Operation Support System (BOSS) at the service center. That is, the administrator sends a cell phone number and a recharge card ID to the BOSS and initiates a recharge service request. The BOSS sends the recharge service request to the OCS which then forwards the recharge service request to the SCP.

Step 202: The SCP queries an abnormal recharge log to see if the abnormal recharge log contains a recharge card ID carried in the recharge service request and if a recharging process has been successfully performed in the OCS via the recharge card associated with the recharge card ID. The abnormal recharge log includes a recharge card ID and the recharge result information indicating whether a recharging process has been successfully performed in the OCS via the recharge card associated with the recharge card ID.

The abnormal recharge log is logged when the recharge procedure is abnormal. That is, the abnormal recharge log is logged when the signaling loss or signaling timeout at a certain signaling layer occurs and it can not be determined whether the OCS has performed a successful recharge or whether the VC has successfully set the recharge card. The abnormal recharge log may also be logged in a normal recharge procedure. The time and condition for logging are not limited to the situation when the recharge is abnormal. As illustrated in Table 1, an instance of the abnormal recharge log according to the present disclosure is given below.

TABLE 1

Recharge Log

| Recharge Number | User Account to be Recharged | Recharge Card ID | Recharge Result Information |
|---|---|---|---|
| ... | ... | ... | Recharge Successfully |

In the above Table 1, the recharge result information in the abnormal recharge log may use "0" and "1" to indicate whether a recharging process has or has not been successfully performed via the recharge card. For instance, "0' may represent a successful recharge while "1" may represent a recharge failure. Or, the recharge result information may be indicated in an original manner or in other manner.

After the SCP receives the recharge service request, the SCP may query the abnormal recharge log stored by the SCP itself, or the SCP may send an authentication request to the OCS and query the abnormal recharge log stored by OCS. The abnormal recharge log at least includes a recharge number, a user account to be recharged, and a recharge card ID. The SCP may query the abnormal recharge log about whether the abnormal recharge log contains the recharge card ID carried in the current recharge service request and the recharge record of the recharge card associated with the recharge card ID. The SCP may also query the abnormal recharge log about whether a recharging process has been successfully performed in the OCS via the recharge card. For instance, if the recharge result information is indicated with an indicator having a value of "0", it means that the recharge is successful. If the value is "1", it means that the recharge fails. If the abnormal recharge log includes a recharge card ID carried in the current recharge service request and if a recharging process has been successfully performed in the OCS via the recharge card associated with the recharge card ID, the SCP may return an authentication failure message to the user terminal initiating the recharge service request and stop performing subsequent recharge procedure; otherwise, the method proceeds to step 203.

Step 203: When the SCP is informed by query the abnormal recharge log that the user account to be recharged is an OCS user account, the SCP may send a recharge card authentication request to the home VC administering the recharge card associated with the recharge card ID carried in the recharge service request. The authentication request may carry the recharge card ID.

Step 204: After the VC receives the recharge card authentication request sent by the SCP, the VC authenticates the validity of the recharge card. That is, the VC may check the status of the recharge card and determine whether the recharge card is valid, and may return an authentication result message to the SCP. The authentication result may contain information such as amount, status, valid period of the recharge card. If the recharge card passes the authentication, the VC may return to the SCP an authentication result message indicating that the recharge card has passed the authentication. The authentication result message contains information such as amount, status, and valid period of the recharge card. If the recharge card does not pass the authentication, the VC may return to the SCP an authentication result message indicating that the recharge card has not passed the authentication.

Step 205: According to the authentication result message returned from the VC, if the recharge card passes the authentication, the SCP sends a recharge request to the OCS, requesting the OCS to recharge the user account to be recharged via the recharge card. The recharge request contains the recharge card ID and the user account to be recharged. In particular, the recharge request may be a Credit Control Request (CCR) Initial message. If the recharge card fails the authentication, the SCP will not perform subsequent recharge procedure.

Step 206: After the OCS receives the recharge request sent by the SCP, the OCS recharges the user account to be recharged via the recharge card. After the recharge is completed successfully, the OCS may return an acknowledgement indicating a successful recharge. Such acknowledgement may be a Credit Control Answer (CCA) Initial message.

Step 207: After the SCP receives the acknowledgement indicating a successful recharge returned from the OCS, the SCP sends a recharge card setting request to the VC, requesting the VC to set the recharge card associated with the recharge card ID carried in the setting request and set the recharge card to an invalid status. The recharge card setting request contains the recharge card ID.

Step 208: After the VC receives the setting request sent by the SCP, the VC modifies the status of the recharge card associated with the recharge card ID to an invalid status and logs the current recharge information, e.g., the user account recharged, the recharge time, etc. After the recharge card is set, the VC returns a recharge card setting response to the SCP.

Step 209 is performed when the SCP fails to generate or send the recharge card setting request, or when the SCP fails to receive the recharge card setting response from the VC within a predetermined time period after the SCP sends the recharge card setting request due to the reason that the VC fails to set the recharge card, or when the SCP fails to receive the acknowledgement indicating a successful recharge from the OCS within a predetermined time period after the recharge request is sent due to the reason that the OCS recharges the recharge card successfully but the call times out; otherwise, step 210 is performed.

Step 209: The SCP writes the recharge card ID in the abnormal recharge log and records the recharge result information in the abnormal recharge log indicating that a recharging process has been successfully performed via the recharge card associated with the recharge card ID.

As another feasible embodiment, the SCP may not record on its own the recharge card ID and the corresponding recharge result information in the abnormal recharge log. Rather, the SCP may instruct the OCS to record the above information, or the OCS writes the recharge card ID into the abnormal recharge log when the OCS fails to generate or send the acknowledgement indicating a successful recharge. The abnormal recharge log contains the recharge card ID and the recharge result information indicating whether a recharging process has been successfully performed via the recharge card associated with the recharge card ID.

Step 210: After the SCP receives the recharge card setting response from the VC, the SCP determines based on the recharge card setting response whether the VC has set the recharge card successfully. If the recharge card is set successfully, step 211 is performed. If the recharge card is not set successfully, subsequent recharge procedure will not be performed.

Step 211: The SCP sends a recharge confirmation request to the OCS, requesting the OCS to confirm the recharge. In particular, the recharge confirmation request may be a Credit Control Request (CCR) Termination (Term) message.

Step 212: After the OCS receives the recharge confirmation request from the SCP, the OCS hands over the recharge transaction and returns a recharge confirmation result to the SCP, where the recharge confirmation result carries recharge time and recharge amount. The recharge confirmation result may be a Credit Control Answer (CCA) Termination (Term) message.

In the recharge procedure shown in FIG. 2, at step 202, when the SCP discovers that the abnormal recharge log contains the recharge card ID carried in the recharge service request and a recharging process has not been successfully performed via the recharge card associated with the recharge card ID, the SCP may continue to query the abnormal recharge log to determine whether or not to recharge the user account which was recharged before. That is, the SCP may determine whether the user account carried in the current recharge service request is the same as the user account in the abnormal recharge log to which the recharge card ID carried in the current recharge service request corresponds. If they are the same, the authentication is passed; otherwise, an authentication failure message may be returned to the user terminal and subsequent recharge procedure will not be performed. Thus, it is guaranteed that one recharge card can only be used for recharging the same user.

As another feasible embodiment, when the SCP discovers that the abnormal recharge log contains the recharge card ID carried in the recharge service request and a recharging process has not been successfully performed via the recharge card associated with the recharge card ID, the SCP proceeds to subsequent recharge procedure. The SCP may send a recharge card authentication request to the VC, interrogating the status of the recharge card. If the VC determines that the recharge card is in an unavailable status, i.e., locked status, the VC may return to the SCP an authentication result message indicating that the recharge card fails to pass the authentication and no subsequent recharge procedure will be performed. Alternatively, when the VC determines that the recharge card is in a valid status, the VC may further check whether a setting failure log contains the recharge card ID carried in the authentication request and whether the user account carried in the authentication request is the same as the user account in the setting failure log to which the recharge card ID carried in the authentication request corresponds. If they are not the same, the VC may return to the SCP an authentication result message indicating that the recharge card has not passed the authentication and subsequent recharge procedure will not be performed. If they are the same, the VC may send to the SCP an authentication result message indicating that the recharge card has passed the authentication and step 205 is performed. Thus, when the SCP discovers that the abnormal recharge log records a recharge failure of the recharge card, authentication can be performed at the VC side. Thus, it is also guaranteed that one recharge card can only be used for recharging the same user.

As another feasible embodiment, when one VC corresponds to a plurality of different SCPs, for instance, for the first time recharge number A recharges the recharged number B and, for the second time the recharge number A recharges the recharged number C, then, because the home SCP to the recharged number C and the home SCP to the recharged number B are not same at step 202, the abnormal recharge log at the home SCP to the recharged number C does not contain recharge records of the recharge card associated with the recharge card ID carried in the recharge service request. Therefore, the method proceeds to step 203. The SCP sends an authentication request to the VC, interrogating about the recharge card information. When the VC determines that status of the recharge card is invalid or unavailable, the VC sends to the SCP an authentication result message indicating that the recharge card does not pass the authentication and subsequent recharge procedure will not be performed. If the status of the recharge card is valid, the VC sends an authentication result message indicating that the recharge card has passed the authentication. Consequently, the problem that one recharge card can be used for recharging repeatedly when VC corresponds to a plurality of SCPs can be addressed.

In the recharge procedure according to the present disclosure, the VC locks the recharge card when the VC fails to set the recharge card or when the VC fails to receive the recharge card setting request for the recharge card sent by the SCP within a predetermined time period after the VC sends to the OCS the authentication result message indicating that the recharge card passes the authentication. At that moment, the VC may lock the recharge card and set the recharge card to an unavailable status. The unavailable status means that it is unknown about whether the recharge card is set or not or it is unknown about whether the recharge card is in a valid status or an invalid status.

As yet another feasible embodiment, when one VC corresponds to a plurality of SCPs, because, at step 202, the abnormal recharge log at the SCP does not contain recharge records of the recharge card associated with the recharge card ID carried in the recharge service request, the method proceeds to step 203, i.e., the SCP sends an authentication request to the VC, interrogating about the recharge card information. When the VC determines that status of the recharge card is valid, the VC may continue to check whether the setting failure log contains the recharge card ID carried in the authentication request and whether the user account carried in the authentication request is the same as the user account in the setting failure log to which the recharge card ID carried in the authentication request corresponds. The setting failure log is recorded by the VC when abnormality occurs during the VC setting the recharge card. The setting failure log contains relationship between a recharge card ID of the recharge card where the setting fails and the recharged user account. If the user account carried in the authentication request is different from the user account in the setting failure log to which the recharge card ID carried in the authentication request corresponds, the VC may return to the SCP an authentication result message indicating that the recharge card has not passed the authentication and subsequent recharge procedure will not be performed. If the user account carried in the authentication request is the same as the user account in the setting failure log associated with the recharge card ID carried in the authentication request, the VC may send to the SCP an authentication result message indicating that the recharge card has passed the authentication and step 205 is performed. Thus, it is guaranteed that one recharge card can only be used for recharging the same user.

In the recharge procedure according to the present embodiment, the VC setting failure log is recorded when the VC fails to set the recharge card or when the VC fails to receive the recharge card setting request for the recharge card sent by the SCP within a predetermined time period after the VC sends to the OCS the authentication result message indicating that the recharge card passes the authentication. At that moment, the VC may record the relationship between the recharge card ID of the recharge card where the setting fails and the user account recharged currently so as to bond the recharge card with the recharged user account. In a next recharge procedure, the setting failure log may be used to ensure that the recharge card can only be used for recharging the same user.

When the setting fails during the recharge procedure as illustrated in FIG. 2, the VC locks the recharge card. The SCP sends the abnormal recharge log to the VC. The VC compares the abnormal recharge log and the setting failure log it records. If the abnormal recharge log and the setting failure log contain a same recharge card ID, and the abnormal recharge log indicates that a recharging process has been successfully performed in the OCS via the recharge card, the VC may set the recharge card associated with the recharge card ID to an invalid status. Then, the VC may back up the related information of the recharge card ID recorded in the setting failure log and delete this information. After the SCP confirms that the VC has completed the check on the abnormal recharge log, the SCP backs up related information contained in the abnormal recharge log and delete this information. The above auditing mechanism may be performed manually or automatically. The manual manner is to send the abnormal recharge log in the SCP to the VC via FTP or other method. The VC audits the abnormal recharge log off line by comparing the abnormal recharge log with the setting failure log and performing corresponding operations. The automatic manner refers to that the SCP automatically sends the abnormal recharge log to the VC on a regular basis and compares the setting failure log in the VC with the abnormal recharge log. The period may be set as desired, for example, once every 10 minutes or once a day.

FIG. 2 illustrates an embodiment of a method for handling a recharge service. When the VC fails to set the recharge card or the OCS call times out, the SCP or OCS may record an abnormal recharge log. The VC locks the card and records a setting failure log and establishes an auditing mechanism for the two logs. Consequently, the situation that one recharge card is used for recharging repeatedly can be prevented effectively, thus avoiding economic loss to the operator.

Figure 3:
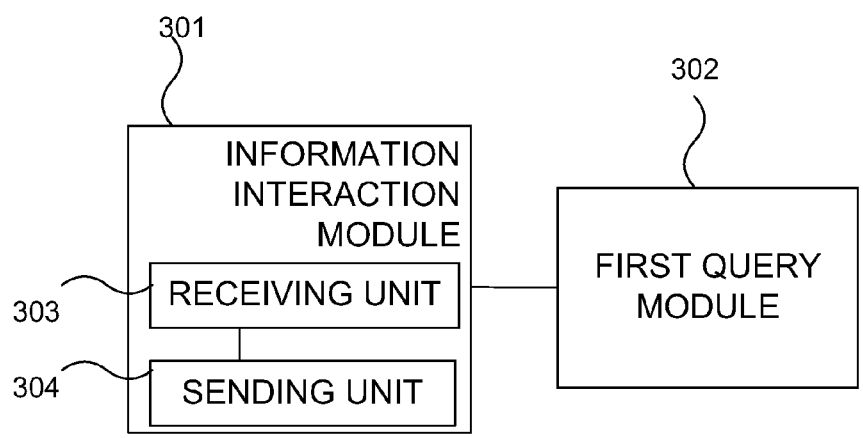
FIG. 3 is a block diagram of a communication apparatus according to a first apparatus embodiment of the present disclosure.

FIG. 3 illustrates a block diagram of a communication apparatus according to a first apparatus embodiment of the present disclosure. The communication apparatus according to the present embodiment may serve as an SCP, implementing related functions of the SCP in the recharge procedure according to embodiments of the present disclosure. The communication apparatus includes an information interaction module 301 and a first query module 302.

The information interaction module 301 is configured to receive a recharge service request sent by a user terminal. The recharge service request includes a recharge card ID and a user account to be recharged. The recharge card ID is used to uniquely identify the recharge card. In particular, the recharge card ID may be a recharge card number or a recharge card key, or may be a combination of the recharge card number and the recharge card key. The first query module 302 is configured to query an abnormal recharge log about whether the abnormal recharge log contains a recharge card ID carried in the recharge service request and whether a recharging process has been successfully performed in the OCS via the recharge card associated with the recharge card ID after the information interaction module 301 receives the recharge service request initiated by the user terminal in an automatic manner or in a manual manner via a service center. The abnormal recharge log may include a recharge card ID and recharge result information indicating whether a recharging process has been successfully performed in the OCS via the recharge card associated with the recharge card ID. According to the query result from the first query module 302, if a recharging process has not been successfully performed via the recharge card associated with the recharge card ID, or the abnormal recharge log does not include the recharge card ID carried in the recharge service request, the information interaction module 301 may interact with the VC or OSC according to the query result obtained from the first query module 302, requesting the home VC administrating the recharge card to authenticate the recharge card and to recharge, after the recharge card passes the authentication, the user account to be recharged via the recharge card.

The communication apparatus according to the present embodiment effectively prevents a recharge card from being used for recharge repeatedly by querying the abnormal recharge log, and thus avoiding economic loss to the operator.

Furthermore, in the communication apparatus as illustrated in FIG. 3, the information interaction module 301 may include a receiving unit 303 and a sending unit 304. The receiving unit 303 is configured to receive the recharge service request which includes a recharge card ID and a user account to be recharged. The receiving unit 303 is further configured to receive an authentication result message returned from the VC and an acknowledgement indicating a successful recharge returned from the OCS. The receiving unit 303 is further configured to receive a recharge card setting response returned from the VC after the VC successfully sets the recharge card and a recharge confirmation result returned from the OCS. According to the query result obtained by the first query module 302, the sending unit 304 is configured to generate and send a recharge card authentication request to the VC when a recharging process has not been successfully performed via the recharge card associated with the recharge card ID carried in the recharge service request. The sending unit 304 is further configured to generate a recharge request requesting to recharge the user account to be recharged and send the message to the OCS when the recharge card passes the authentication by the VC, and configured to generate and send a recharge card setting request to the VC and generate and send a recharge confirmation request to the OCS. That is, during the interaction between the information interaction module 301 and the VC, OCS, the receiving unit 303 and the sending unit 304 are responsible for receiving and sending related communication information respectively.

Figure 4:
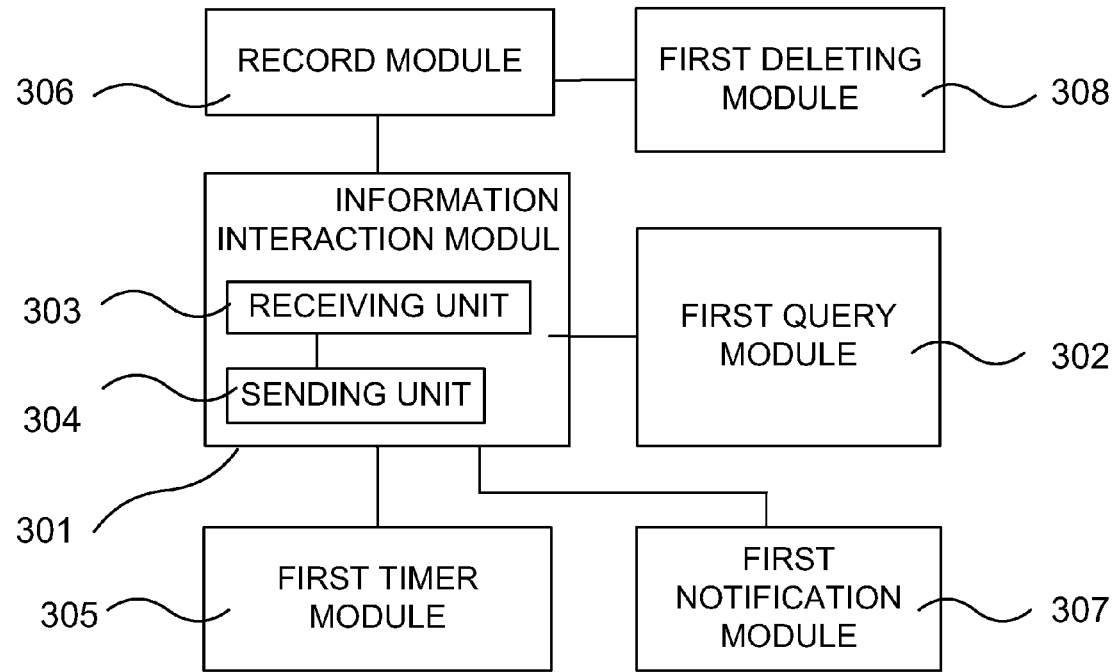
FIG. 4 is a block diagram of a communication apparatus according to a second apparatus embodiment of the present disclosure.

FIG. 4 illustrates a block diagram of a communication apparatus according to a second apparatus embodiment of the present disclosure. Compared with the communication apparatus illustrated in FIG. 3, the communication apparatus of the present embodiment may further include a first timer module 305, a record module 306 and a first notification module 307.

The first timer module 305 is configured to count a predetermined time period after the sending unit 304 sends a recharge card setting request to the VC or the sending module 304 sends a recharge request to the OCS. The predetermined time period may be set as desired, for example, 5 seconds. The record module 306 is configured to record in an abnormal recharge log a recharge card ID and recharge result information indicating whether a recharging process has been successfully performed in the OCS via the recharge card when the sending unit 304 fails to generate a recharge card setting request, or when the receiving unit 303 fails to receive the recharge card setting response for the recharge card within a predetermined time period after the sending unit 304 sends the recharge card setting request according to the timing result from the first timer module 305, or when the receiving unit 303 fails to receive the acknowledgement indicating a successful recharge returned from the OCS within a predetermined time period after the sending unit 304 sends a recharge request to the OCS. The first notification module 307 is configured to send a write-in notification message to the OCS, informing the OCS to record in the abnormal recharge log the recharge card ID and the recharge result information indicating whether a recharging process has not been successfully performed in the OCS via the recharge card identified by the recharge card ID.

Referring again to FIG. 4, the communication apparatus of the present embodiment may further include a first deleting module 308. The first deleting module 308 is configured to delete, after the VC completes the check on the abnormal recharge log, related information of the recharge card ID in the abnormal recharge log if the abnormal recharge log and the setting failure log contain a same recharge card ID and if a recharging process has been successfully performed in the OCS via the recharge card associated with the recharge card ID. The setting failure log contains relationship between the recharge card ID of the recharge card where the setting fails and the user account recharged currently.

The communication apparatus according to the present embodiment shown in FIG. 4 may effectively prevent a recharge card from being used for recharge repeatedly by making record in an abnormal recharge log when abnormality occurs during the recharge procedure. Thus, economic loss to the operator is avoided.

Figure 5:
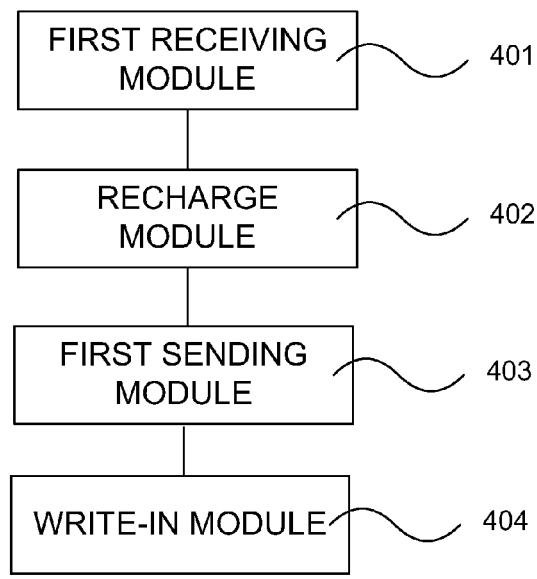
FIG. 5 is a block diagram of a communication apparatus according to a third apparatus embodiment of the present disclosure.

FIG. 5 illustrates a block diagram of a communication apparatus according to a third apparatus embodiment of the present disclosure. The communication apparatus according to the present embodiment may serve as an OCS, implementing related functions of the OCS in the recharge procedure according to embodiments of the present disclosure. The communication apparatus may include a first receiving module 401, a recharge module 402, a first sending module 403 and a write-in module 404.

The first receiving module 401 is configured to receive a recharge request for recharging the user account sent by the SCP. The recharge request includes a recharge card ID and a user account to be recharged. The first receiving module 401 is further configured to receive a recharge confirmation request sent by the SCP. The recharge card ID is used to uniquely identify the recharge card. In particular, the recharge card ID may be a recharge card number or a recharge card key, or may be a combination of the recharge card number and the recharge card key. The recharge module 402 is configured to recharge the user account to be recharged via the recharge card and generate an acknowledgement indicating a successful recharge when the first receiving module 401 receives the recharge request sent by the SCP. The recharge module 402 is further configured to complete the recharge and generate a recharge confirmation result when the first receiving module 401 receives the recharge confirmation request. The recharge confirmation result includes recharge time and recharge amount, etc. The first sending module 403 is configured to send the acknowledgement indicating a successful recharge to the SCP after the recharge module 402 recharges the user account to be recharged. Furthermore, the first sending module 403 is further configured to send the recharge confirmation result to the SCP. The write-in module 404 is configured to record the recharge card ID and the recharge result information indicating that a recharging process has been successfully performed via the recharge card associated with the recharge card ID when the write-in module 404 receives a write-in notification sent by the SCP or when the recharge module 402 fails to generate the acknowledgement indicating a successful recharge or when the first sending module 403 fails to send the acknowledgement indicating a successful recharge.

The communication apparatus according to the present embodiment effectively prevents a recharge card from being used for recharge repeatedly by recording the abnormal recharge log and verifying the validity of the recharge card information. Thus, economic loss to the operator can be avoided.

Figure 6:
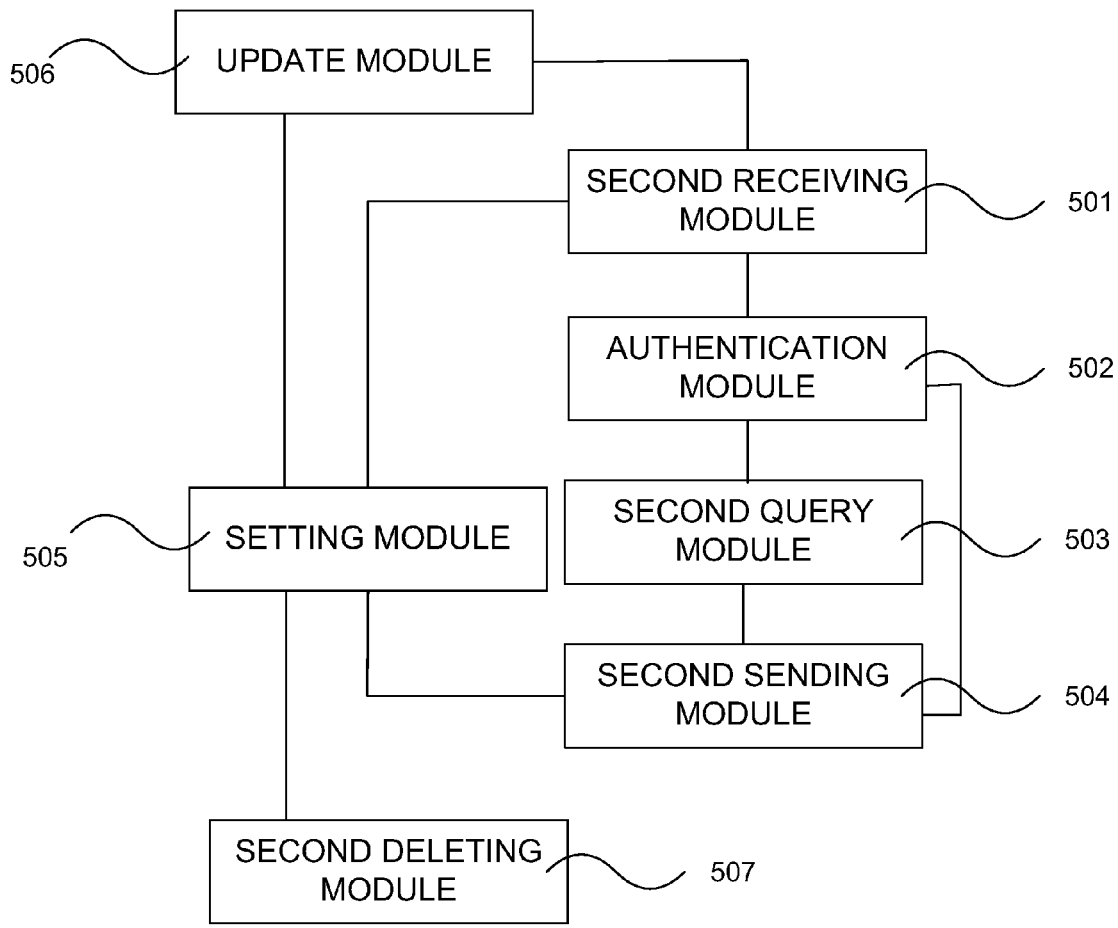
FIG. 6 is a block diagram of a communication apparatus according to a fourth apparatus embodiment of the present disclosure.

FIG. 6 illustrates a block diagram of a communication apparatus according to a fourth apparatus embodiment of the present disclosure. The communication apparatus according to the present embodiment may serve as a VC, implementing related functions of the VC in the recharge procedure according to embodiments of the present disclosure. The communication apparatus may include a second receiving module 501, an authentication module 502, a second query module 503, a second sending module 504 and a setting module 505.

The second receiving module 501 is configured to receive the recharge card authentication request sent by the SCP to the VC. The authentication request carries a recharge card ID which may uniquely identify the recharge card. In particular, the recharge card ID may be a recharge card number or a recharge card key, or may be a combination of the recharge card number and the recharge card key. The second receiving module is further configured to receive the setting request sent by the SCP to the VC after the OCS completes the recharge successfully. The authentication module 502 is configured to authenticate the validity of the recharge card associated with the recharge card ID carried in the authentication request after the authentication request is received. The second query module 503 is configured to check, based on the determination result from the authentication module 502, whether the setting failure log contains the recharge card ID carried in the authentication request and whether the user account carried in the authentication request is the same as the user account in the setting failure log associated with the recharge card ID carried in the authentication request. The setting failure log contains relationship between the recharge card ID of the recharge card where setting fails and the user account. The second sending module 504 is configured to send, based on the result obtained from the authentication module 502 and the second query module 503, an authentication result message indicating that the recharge card has passed the authentication to the SCP when the setting failure log does not contain the recharge card ID carried in the authentication request, or the recharge card is in a valid status, or the recharge card is in a valid status and the user account carried in the authentication request is the same as the user account in the setting failure log associated with the recharge card ID carried in the authentication request. The second sending module 504 is configured to send an authentication result message indicating that the recharge card has not passed the authentication to the SCP when the recharge card associated with the recharge card ID carried in the authentication request is in an invalid or unavailable status or when the recharge card is valid but the user account carried n the authentication request is different from the user account in the setting failure log associated with the recharge card ID carried in the authentication request. The second sending module 504 is further configured to send a recharge card setting response to the SCP after the setting module 505 sets the recharge card successfully. The setting module 505 is configured to set the recharge card associated with the recharge card ID according to the recharge card setting request, or configured to set the recharge card associated with the recharge card ID by modifying the status of the recharge card which has been used for recharge successfully to an invalid status when the abnormal recharge log and the setting failure log have a same recharge card ID and a recharging process has been successfully performed via the recharge card associated with the recharge card ID.

The communication apparatus as illustrated in FIG. 6 may further include an update module 506. The update module 506 is configured to record the relationship between the recharge card ID and user account recharged currently into the setting failure record when the setting module 505 fails to set the recharge card or when the second receiving module 501 fails to receive the recharge card setting request for the recharge card within a predetermined time period after the second sending module 504 sends to the SCP the authentication result message indicating that the recharge card has passed the authentication.

Furthermore, the communication apparatus as illustrated in FIG. 6 may further include a second deleting module 507. The second deleting module 507 is configured to back up the relationship between the recharge card and the user account in the setting failure log and delete the relationship when the VC completes the check on the abnormal recharge log sent by the SCP and when the abnormal recharge log and the setting failure log have the same recharge card ID and a recharging process has been successfully performed in the OCS via the recharge card associated with the recharge card ID.

The communication apparatus according to the above embodiment may effectively prevent a recharge card from being used for recharge repeatedly by locking the recharge card and making record in the setting failure log when the VC fails to set the recharge card. Thus, economic loss to the operator can be avoided.

Figure 7:
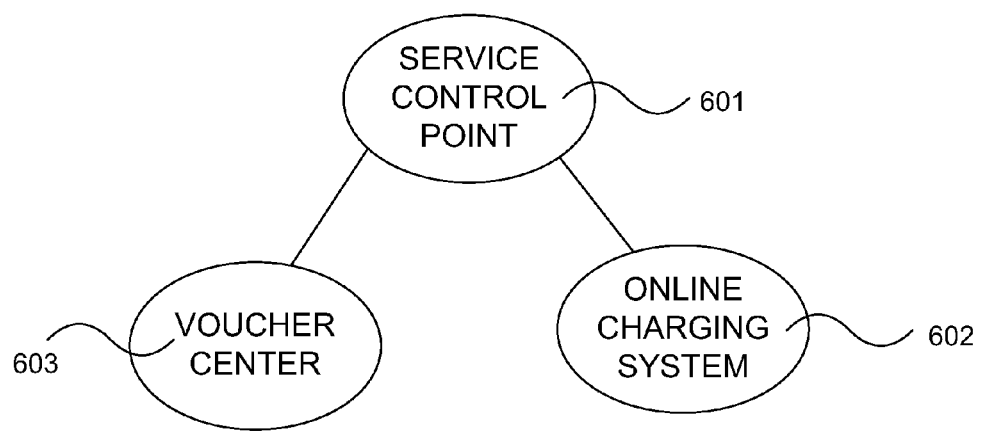
FIG. 7 illustrates a block diagram of a system for handling a recharge service according to one embodiment of the present disclosure.

FIG. 7 illustrates a block diagram of a system for handling recharge service according to one embodiment of the present disclosure. The system for handling recharge service may include a service control point 601, an online charging system 602 and a voucher center 603. The service control point 601 is configured to receive a recharge service request including a recharge card ID and a user account to be recharged, and check whether an abnormal recharge log includes the recharge card ID carried in the recharge service request and whether a recharging process has been successfully performed in the online charging system 602 via the recharge card associated with the recharge card ID. The abnormal recharge log includes a recharge card ID and recharge result information indicating whether a recharging process has been successfully performed in the online charging system 602 via the recharge card associated with the recharge card ID. If a recharging process has not been successfully performed via the recharge card associated with the recharge card ID, or the abnormal recharge log does not include the recharge card ID carried in the recharge service request, the service control point 601 sends a recharge card authentication request to the voucher center 603, requesting the voucher center 603 to authenticate the recharge card and interacts with the online charging system 602 and the voucher center 603 and recharge the user account to be recharged via the recharge card after the recharge card passes the authentication.

In the system for handling recharge service as illustrated in FIG. 7, the service control point 601 may be any communication apparatus illustrated in FIG. 3 and FIG. 4. The online charging system 602 may be a communication apparatus in FIG. 5. The voucher center may be a communication apparatus in FIG. 6.

The system for handling a recharge service according to the present embodiment provides improvements in the service control point, the online charging system and the voucher center. By recording the abnormal recharge log, having the VC lock the recharge card, recording the setting failure log, and establishing an auditing mechanism for the two logs, the situation that one recharge card is used for recharge repeatedly can be prevented effectively. Thus, economic loss to the operator can be avoided.

Figure 8:
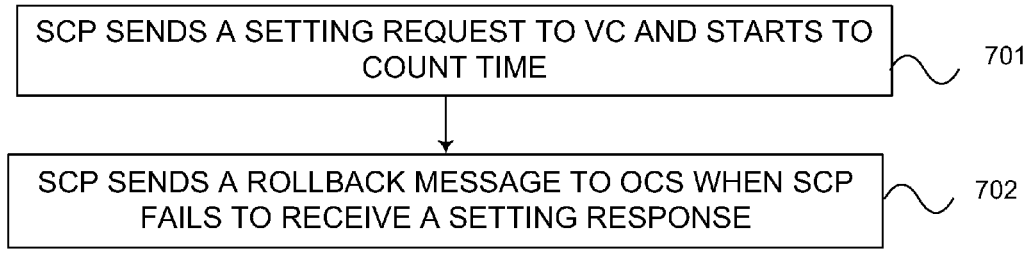
FIG. 8 is a flowchart of a method for handling a recharge service according to a third method embodiment of the present disclosure.

FIG. 8 is a flowchart of a method for handling a recharge service according to a third method embodiment of the present disclosure. The method includes the following steps.

Step 701: The SCP sends a recharge card setting request to the VC and starts to count the time. The recharge card setting request includes a recharge card ID. The recharge card ID is used to uniquely identify the recharge card. In particular, the recharge card ID may be a recharge card number or a recharge card key, or may be a combination of the recharge card number and the recharge card key.

Step 702: The SCP sends a rollback request to the OCS when the SCP fails to send the recharge card setting request or the SCP fails to receive the recharge card setting response returned by the VC in response to the recharge card setting request within a predetermined time period after the recharge card setting request is sent. The rollback request is used to request the OCS to stop depositing credit into the user account to be recharged. The rollback request includes a recharge card ID carried in the setting request and a user account to be recharged.

Figure 9:
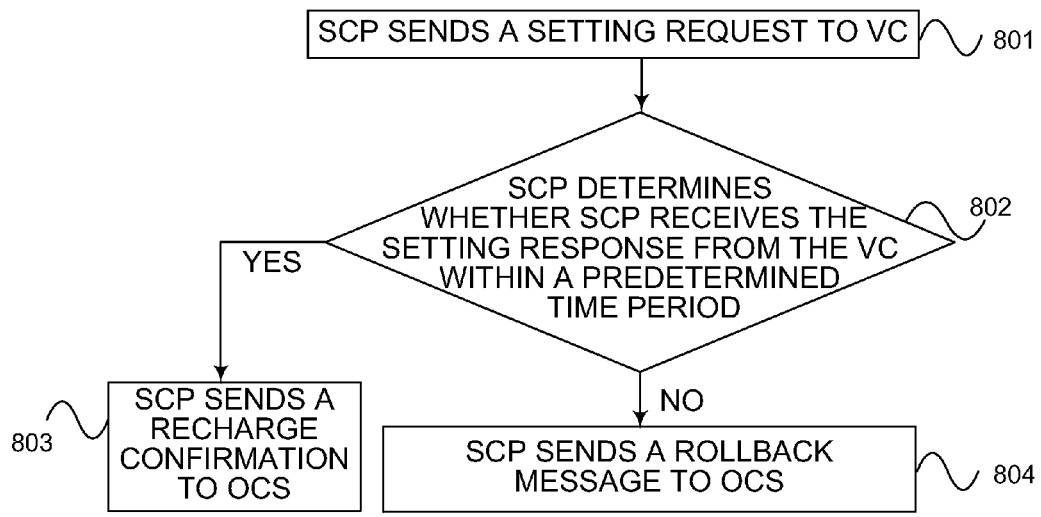
FIG. 9 is a flowchart of a method for handling a recharge service according to a fourth method embodiment of the present disclosure.

FIG. 9 is a flowchart of a method for handling a recharge service according to a fourth method embodiment of the present disclosure. The method includes the following steps.

Step 801: After the SCP initiates a recharge procedure and when the SCP sends a recharge card setting request to the VC, the SCP starts to count the time. The recharge card setting request includes a recharge card ID. The recharge card ID is used to uniquely identify the recharge card. In particular, the recharge card ID may be a recharge card number or a recharge card key, or may be a combination of the recharge card number and the recharge card key.

Step 802: The SCP determines whether the SCP fails to send the recharge card setting request or whether the SCP can receive the recharge card setting response returned by the VC in response to the recharge card setting request within a predetermined time period after the recharge card setting request is sent. If the SCP is able to receive the setting response within the predetermined time period, step 803 is performed; otherwise, step 804 is performed.

Step 803: The SCP continues to perform subsequent steps according to the normal recharge procedure. For instance, the SCP may send a recharge configuration request to the OCS.

Step 804: The SCP sends a rollback request to the OCS. The rollback request is used to request the OCS to stop depositing the credit into the user account to be recharged. The rollback request includes a recharge card ID and a user account to be recharged. The rollback request may be a REFUND-ACCOUNT message.

After step 802, the OCS may return a rollback result to the SCP after the rollback is done. The SCP generally has 5 seconds to wait until timeout. An integrated charging engine has 60 seconds to wait for the final confirmation message and to submit the recharge transaction. Therefore, the situation that the SCP determines that the response message is time out and sends the rollback message to the integrated charging engine which has already submitted the transaction can be avoided.

The method for handling recharge service described according to the embodiments shown in FIG. 8 and FIG. 9 may effectively prevent a recharge card from being used for recharge repeatedly by building up a rollback mechanism when the VC fails to set the recharge card. Thus, economic loss to the operator can be avoided.

Figure 10:
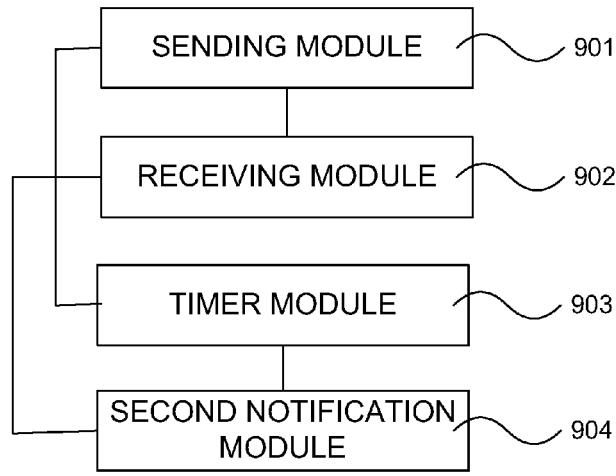
FIG. 10 is a block diagram of a communication apparatus according to a fifth apparatus embodiment of the present disclosure.

FIG. 10 illustrates a block diagram of a communication apparatus according to a fifth apparatus embodiment of the present disclosure. The communication apparatus according to the present embodiment may serve as an SCP, implementing related functions of the SCP in the recharge procedure according to embodiments of the present disclosure. The communication apparatus may include a sending module 901, a receiving module 902, a timer module 903 and a second notification module 904.

The sending module 901 is configured to send a recharge card setting request to the VC. The receiving module 902 is configured to receive the recharge card setting response returned by the VC in response to the recharge card setting request. The timer module 903 is configured to count a predetermined time period after the sending module 901 sends the recharge card setting request. The second notification module 904 is configured to send a rollback request to the OCS when the sending module 901 fails to send the recharge card setting request or the receiving module 902 fails to receive the recharge card setting response within a predetermined time period after the sending module 901 sends the recharge card setting request according to the timing result from the timer module 903. The rollback request is used to request the OCS to stop depositing the credit into the user account to be recharged. The rollback request includes a recharge card ID and a user account to be recharged.

The apparatus for handling recharge service according to the present embodiment may effectively prevent a recharge card from being used for recharge repeatedly by building up a rollback mechanism when the VC fails to set the recharge card. Thus, economic loss to the operator can be avoided.

The system for handling recharge service according to the present disclosure may include a service control point, an online charging system and a voucher center. The service control point is configured to send a recharge card setting request to the voucher center and start to count the time wherein the recharge card setting request may include a recharge card ID. The service control point is further configured to send a rollback request to the online charging system when the service control point fails to send the recharge card setting request or the service control point fails to receive the recharge card setting response returned by the voucher center in response to the recharge card setting request within a predetermined time period after the recharge card setting request is sent. The rollback request is used to request the OCS to stop depositing the credit into the user account to be recharged. The rollback request includes a recharge card ID and a user account to be recharged.

The system for handling recharge service according to the present embodiment may effectively prevent a recharge card from being used for recharge repeatedly by building up a rollback mechanism when the VC fails to set the recharge card. Thus, economic loss to the operator can be avoided.

It is appreciated by those skilled in the art that the entire or partial steps in the above method embodiments can be implemented with hardware when instructed by programs. Such programs may be stored in a computer readable storage media. When the program is being executed, the steps in the above method embodiments are executed. The storage media may include various media which store the program codes such as ROM, RAM, magnetic disc, or optical disc, etc.

The embodiments of the present disclosure effectively prevents a recharge card from being used for recharge repeatedly by recording the abnormal recharge log, having the VC lock the card and building up an auditing mechanism for the abnormal recharge log. Thus, economic loss to the operator can be avoided.

It should be noted that the foregoing embodiments are merely illustrations for the technical solutions of the present disclosure, as the invention is not so limited. Although preferred embodiments are provided for illustration of the present disclosure, it is appreciated by a person of ordinary skill in the art that any modifications or equivalents may be made to the technical solutions of the present disclosure without departing from the spirit and scope of the technical solutions of the present disclosure.

What is claimed is:

1. A method for handling a recharge service, comprising:
receiving, by a service control point (SCP), a recharge service request including a recharge card ID and a user account to be recharged;
sending, by the SCP, an authentication request to an online charging system (OCS) to query an abnormal recharge log stored by the OCS,
wherein the abnormal recharge log is logged by the OCS when receiving an instruction from the SCP, when the SCP fails to receive an acknowledgement indicating a successful recharge from the OCS within a predetermined time period, after the SCP sends a recharge request, or when the OCS fails to generate or send the acknowledgement indicating the successful recharge, and the abnormal recharge log includes (a) recharge result information indicating whether a recharging process has been successfully performed in the OCS and (b) an recharge ID corresponding to the recharge result information;
checking whether the abnormal recharge log includes the recharge card ID and whether the recharging process has been successfully performed in the OCS via a recharge card associated with the recharge card ID according to the abnormal recharge log; and
requesting, by the SCP, a voucher center to authenticate the recharge card associated with the recharge card ID so that the voucher center may recharge, after the recharge card passes the authentication, the user account via the recharge card if the recharge card ID carried in the recharge service request is not contained in the abnormal recharge log, or the recharging process has not been successfully performed via the recharge card associated with the recharge card ID carried in the recharge service request.

2. The method of claim 1, wherein recharging the user account via the recharge card comprises:
generating, by the SCP, the recharge request and sending the recharge request to the OCS, requesting the OCS to recharge the user account via the recharge card;
generating, by the SCP, a recharge card setting request and sending the recharge card setting request to the voucher center after receiving the acknowledgement indicating the successful recharge returned by the online charging system, wherein the recharge card setting request includes the recharge card ID;
receiving, by the SCP, a recharge card setting response returned by the voucher center after the voucher center sets the recharge card;
sending, by the SCP, a recharge confirmation request to the online charging system; and
receiving, by the SCP, a recharge confirmation result returned by the online charging system, wherein the recharge confirmation result includes recharge time and recharge amount.

3. The method of claim 1, wherein
the abnormal recharge log comprises the recharge card ID and recharge result information indicating that the recharging process has been successfully performed via the recharge card.

4. The method of claim 3, wherein
requesting, by the SCP, the voucher center to authenticate the recharge card associated with the recharge card ID comprises:
sending, by the service control point, the authentication request to the voucher center, wherein the authentication request carries the recharge card ID carried in the recharge service request;
determining, by the voucher center, the validity of the recharge card associated with the recharge card ID carried in the authentication request, checking whether the recharge card associated with the recharge card ID carried in the authentication request is in an unavailable status; and
sending, by the voucher center, an authentication result message indicating that the recharge card has not passed the authentication to the service control point if the recharge card is in the unavailable status or an invalid status; sending, by the voucher center, an authentication result message indicating that the recharge card has passed the authentication to the service control point if the recharge card is in a valid status.

5. The method of claim 4, wherein setting the status of the recharge card to an unavailable status if the voucher center fails to set the recharge card or the voucher center fails to receive the recharge card setting request for the recharge card within a predetermined time period after the voucher center sends the authentication result message indicating that the recharge card has passed the authentication to the service control point.

6. The method of claim 3, wherein the abnormal recharge log further comprises a user account which is recharged via the recharge card associated with the recharge card ID;
the requesting the voucher center to authenticate the recharge card associated with the recharge card ID comprises:
sending, by the service control point, the authentication request to the voucher center, wherein the authentication request carries the user account and the recharge card ID carried in the recharge service request;
determining, by the voucher center, the validity of the recharge card associated with the recharge card ID carried in the authentication request;
checking whether a setting failure log comprises the recharge card ID carried in the authentication request when the recharge card is valid;
checking whether a user account carried in the authentication request is the same as a user account in the setting failure log associated with the recharge card ID carried in the authentication request, wherein the setting failure log comprises relationship between the recharge card ID of the recharge card where setting fails and a recharged user account;
sending, by the voucher center to the service control point, an authentication result message indicating that the recharge card has not passed the authentication if the user account carried in the authentication request is different from the user account in the setting failure log associated with the recharge card ID carried in the authentication request; and
sending, by the voucher center to the service control point, an authentication result message indicating that the recharge card has passed the authentication, if the setting failure log does not comprise the recharge card ID carried in the authentication request or if the user account carried in the authentication request is the same as the user account in the setting failure log associated with the recharge card ID carried in the authentication request.

7. The method of claim 6, wherein recording, by the voucher center, in the setting failure log the relationship between the recharge card ID of the recharge card where the setting fails and the currently recharged user account, if the voucher center fails to set the recharge card or the voucher center fails to receive the recharge card setting request for the recharge card within the predetermined time period after the voucher center sends the authentication result message indicating that the recharge card has passed the authentication to the service control point.

8. A communication apparatus, comprising:
an information interaction module and a first query module;
the information interaction module is configured to receive a recharge service request which includes a recharge card ID and a user account to be recharged; and the information interaction module is further configured to request a voucher center to authenticate the recharge card, according to a query result obtained by the first query module, if the recharge card ID carried in the recharge service request is not contained in an abnormal recharge log, or a recharging process has not been successfully performed via the recharge card associated with the recharge card ID, so that the voucher center may recharge the user account via the recharge card after the recharge card passes the authentication;
the first query module is configured to check whether the abnormal recharge log includes the recharge card ID and the recharging process has been successfully performed via the recharge card associated with the recharge card ID,
wherein the abnormal recharge log is logged by an online charging system (OCS) when receiving an instruction from the communication apparatus, when the communication apparatus fails to receive an acknowledgement indicating a successful recharge from the OCS within a predetermined time period after the communication apparatus sends a recharge request or when the OCS fails to generate or send the acknowledgement indicating the successful recharge, and the abnormal recharge log includes recharge result information indicating whether a recharging process has been successfully performed in the OCS and recharge ID corresponding to the recharge result information.

9. The communication apparatus of claim 8, wherein the information interaction module comprises a receiving unit and a sending unit;

the receiving unit is configured to receive the recharge service request; and configured to receive an authentication result message returned from the voucher center, the acknowledgement indicating the successful recharge returned from the OCS, a recharge card setting response returned from the voucher center and a recharge confirmation result returned from the online charging system;

according to the query result obtained by the first query module, if the recharging process has not been successfully performed via the recharge card associated with the recharge card ID, the sending unit is configured to generate and send a recharge card authentication request to the voucher center, generate the recharge request for recharging the user account and send the recharge request to the OCS, generate and send a recharge card setting request to the voucher center and generate and send a recharge confirmation request to the OCS.

10. The communication apparatus of claim 9, further comprising:

a first timer module, configured to count a predetermined time period after the sending module sends the recharge request to the online charging system;

a first notification module, configured to send a write-in notification to the online charging system, informing the online charging system to record in the abnormal recharge log the recharge card ID and the recharge result information indicating that the recharging process has been successfully performed via the recharge card, when the following conditions is met:

the receiving unit fails to receive the acknowledgement indicating the successful recharge returned from the OCS within the predetermined time period after the sending unit sends the recharge request to the OCS.

11. An online charging system (OCS), comprising:

a first receiving module, configured to receive a recharge request for recharging a user account sent by a service control point, wherein the recharge request includes a recharge card ID and the user account to be recharged; and further configured to receive a recharge confirmation request sent by the service control point;

a recharge module, configured to recharge the user account via the recharge card and generate an acknowledgement indicating a successful recharge when the first receiving module receives the recharge request, and configured to complete the recharge and generate a recharge confirmation result when the first receiving module receives the recharge confirmation request, wherein the recharge confirmation result comprises recharge time and recharge amount;

a first sending module, configured to send the acknowledgement indicating the successful recharge to the service control point after the recharge module recharges the user account and configured to send the recharge confirmation result to the service control point; and a write-in module, configured to record in an abnormal recharge log the recharge card ID and recharge result information indicating whether a recharging process has been successfully performed via the recharge card associated with the recharge card ID when one of the following conditions is met:

(1) the write-in module receives a write-in notification sent by the service control point when the service control point fails to receive the acknowledgement indicating the successful recharge from the OCS within a predetermined time period after the recharge request is sent;

(2) the recharge module fails to generate the acknowledgement indicating the successful recharge; and (3) the first sending module fails to send the acknowledgement indicating the successful recharge.

* * * * *